(12) United States Patent
Bearden et al.

(10) Patent No.: US 8,096,169 B2
(45) Date of Patent: Jan. 17, 2012

(54) SEAL SECTION ASSEMBLY MECHANICAL FACE SEAL INTEGRITY VERIFICATION TOOL

(75) Inventors: John L. Bearden, Claremore, OK (US);
Steven K. Tetzlaff, Owasso, OK (US)

(73) Assignee: Baker Hughes Incorporated, Houston, TX (US)

( * ) Notice: Subject to any disclaimer, the term of this patent is extended or adjusted under 35 U.S.C. 154(b) by 417 days.

(21) Appl. No.: 12/436,025

(22) Filed: May 5, 2009

(65) Prior Publication Data

US 2009/0272177 A1    Nov. 5, 2009

Related U.S. Application Data

(60) Provisional application No. 61/050,488, filed on May 5, 2008.

(51) Int. Cl.
*G01M 3/06* (2006.01)
*G01M 3/08* (2006.01)

(52) U.S. Cl. .............. 73/49.8; 73/45.5; 73/46; 73/49.7

(58) Field of Classification Search .............. 73/40–49.8
See application file for complete search history.

(56) References Cited

U.S. PATENT DOCUMENTS

| | | | | |
|---|---|---|---|---|
| 3,180,135 A * | 4/1965 | Cain, Jr. et al. | ................... | 73/46 |
| 3,987,663 A * | 10/1976 | Repella | ............................. | 73/46 |
| 4,197,531 A * | 4/1980 | Wentworth, Jr. | .............. | 340/605 |
| 4,382,379 A * | 5/1983 | Kelly | ................................ | 73/46 |
| 4,561,297 A * | 12/1985 | Holland | ..................... | 73/114.45 |
| 4,722,221 A * | 2/1988 | Ferguson | ......................... | 73/168 |
| 5,074,663 A * | 12/1991 | Winterton et al. | ............ | 356/244 |
| 5,383,351 A * | 1/1995 | Kotlyar | ............................ | 73/40 |
| 5,495,750 A * | 3/1996 | Dufresne | ....................... | 73/49.1 |
| 5,756,882 A * | 5/1998 | Cranfill et al. | ................... | 73/46 |
| 5,918,268 A * | 6/1999 | Lukas et al. | ................ | 73/40.5 R |
| 6,094,970 A * | 8/2000 | Sprenger et al. | ................... | 73/40 |
| 6,176,248 B1 * | 1/2001 | Croke et al. | ............... | 137/15.05 |
| 6,592,126 B2 * | 7/2003 | Davis | ............................ | 277/320 |
| 6,763,701 B1 * | 7/2004 | Moretz | .............................. | 73/37 |
| 6,802,203 B1 * | 10/2004 | Averill et al. | ........................ | 73/9 |
| 6,817,228 B2 * | 11/2004 | Upton et al. | ....................... | 73/46 |
| 2007/0116558 A1 * | 5/2007 | Naruse et al. | .................. | 415/200 |

\* cited by examiner

*Primary Examiner* — David Rogers
(74) *Attorney, Agent, or Firm* — Bracewell & Giuliani LLP (57) ABSTRACT

A test device for testing the integrity of a seal has a clear t-shaped liquid reservoir with three ends. A guide adapter is connected to the first end of the liquid reservoir and extends axially therefrom along an axis of the reservoir. A shaft adapter is connected to the second end of the body, opposite the first end. A test shaft with first and second ends extends axially through the first and second ends of the body and test and shaft adapters along the axis. The first end of the shaft is adapted to be connected to the rotating shaft of pump assembly.

19 Claims, 8 Drawing Sheets

SEAL SECTION ASSEMBLY MECHANICAL FACE SEAL INTEGRITY VERIFICATION TOOL

CROSS-REFERENCE TO RELATED APPLICATION

This application claims priority to provisional application 61/050,488, filed May 5, 2008.

FIELD OF THE INVENTION

This disclosure relates to a tool to check the proper assembly and seating of inboard and outboard mechanical face seals.

BACKGROUND OF THE INVENTION

Electrical submersible pumps (ESPs) have been used to lift fluid from bore holes, particularly for oil production. In operation, a pump of an electrical submersible pump is placed below the fluid level in the bore hole. The well fluid often contains corrosive compounds such as brine water, $CO_2$, and $H_2S$ that can shorten the run life of an ESP when the ESP is submerged in the well fluid. Corrosion resistant units have been developed that have motors that utilize seals and barriers to exclude the corrosive agents from the internal mechanisms of the ESP.

A typical submersible pump has a motor, a pump above the motor, and a seal section between the motor and the pump. The seal section allows for expansion of the dielectric oil contained in the rotor gap of the motor. Temperature gradients resulting from an ambient and motor temperature rise cause the dielectric oil to expand. The expansion of the oil is accommodated by the seal section. Additionally, the seal section is provided to equalize the casing annulus pressure with the internal dielectric motor fluid. The equalization of pressure across the motor helps keep well fluid from leaking past sealed joints in the motor. It is important to keep well fluids away from the motor because well fluid that gets into the motor will cause early dielectric failure. Measures commonly employed to prevent well fluids from getting into the motor include the use of elastomeric bladders as well as labyrinth style chambers to isolate the well fluid from the clean dielectric motor fluid. Multiple mechanical shaft seals keep the well fluid from leaking down the shaft. The elastomeric bladder provides a positive barrier to the well fluid. The labyrinth chambers provide fluid separation based on the difference in densities between well fluid and motor oil. Any well fluid that gets past the upper shaft seals or the top chamber is contained in the lower labyrinth chambers as a secondary protection means.

As electric submersible seals are assembled and disassembled, a number of inboard and outboard mechanical shaft seals are dismantled and installed. If a mechanical seal is damaged or not properly sealing, a leak is typically not identified until the seal assembly is complete. This often requires disassembly of the entire seal. A technique is desirable to efficiently test each mechanical shaft seal during assembly or disassembly to ensure its integrity, thereby ensuring the integrity of the seal assembly once fully constructed.

SUMMARY OF THE INVENTION

A device for testing the integrity of mechanical shaft seals has a clear, t-shaped liquid reservoir with three ends. A guide adapter is connected to the first end of the reservoir and extends axially therefrom along an axis of the reservoir. The guide adapter has an opening extending axially therethrough and is adapted to connect to a seal guide of an electric submersible seal. A shaft adapter is connected to the second end of the reservoir, opposite the first end, and has an opening positioned in and extending axially therethrough. A test shaft has first and second ends and extends axially through the first and second ends of the body and the openings in the test and the shaft adapters along the axis. The test shaft is adapted to connect to a rotating shaft of an electrical submersible seal assembly. The third end of the body is perpendicular to the first and second ends and is open to allow fluid to be poured into the liquid reservoir.

In an alternate embodiment, the device for testing the integrity of a seal also has a head adapter connected to the guide adapter opposite the body. The head adapter has a connector flange adapted to connect to a seal head and a sealing section extending axially along the axis therefrom. The sealing section is adapted to sealingly engage the seal head.

In order to test the integrity of a seal, the test shaft is connected to a seal shaft. The liquid reservoir is then placed over and around the test shaft. The guide adapter is then inserted into a seal port, thereby connecting the liquid reservoir to the seal section to be tested. The liquid reservoir is filled with a clear liquid. Pressure is then applied to the backside of the mechanical seal and the clear liquid in the reservoir is observed for the existence of bubbles.

DETAILED DESCRIPTION OF THE INVENTION

Figure 1:
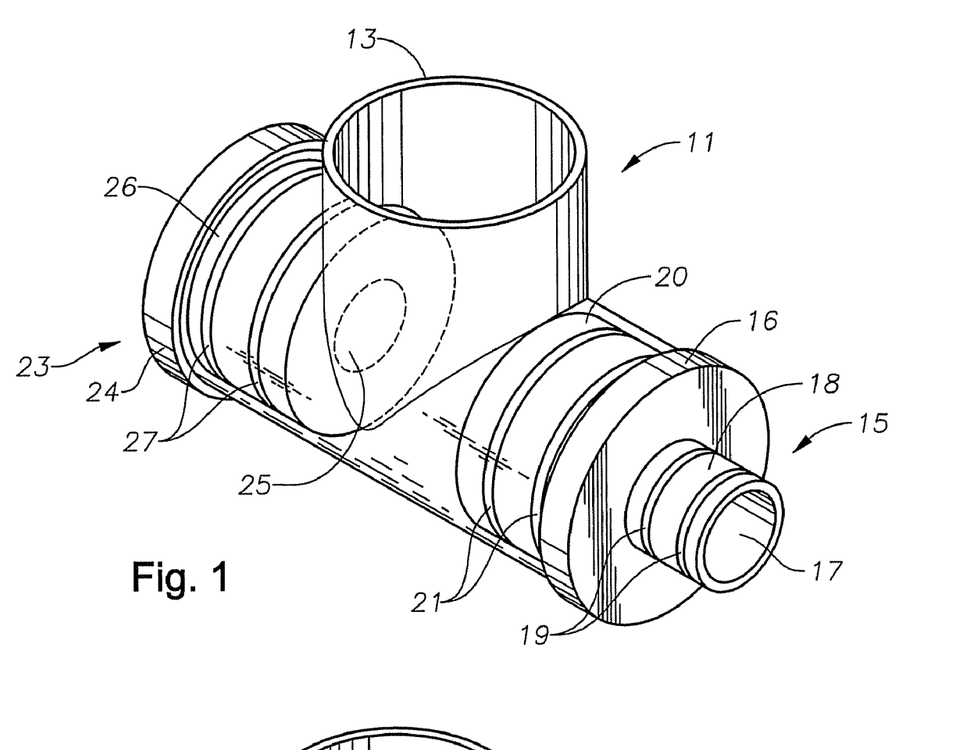
FIG. 1 is an isometric view of a face seal integrity verification tool.
Figure 2:
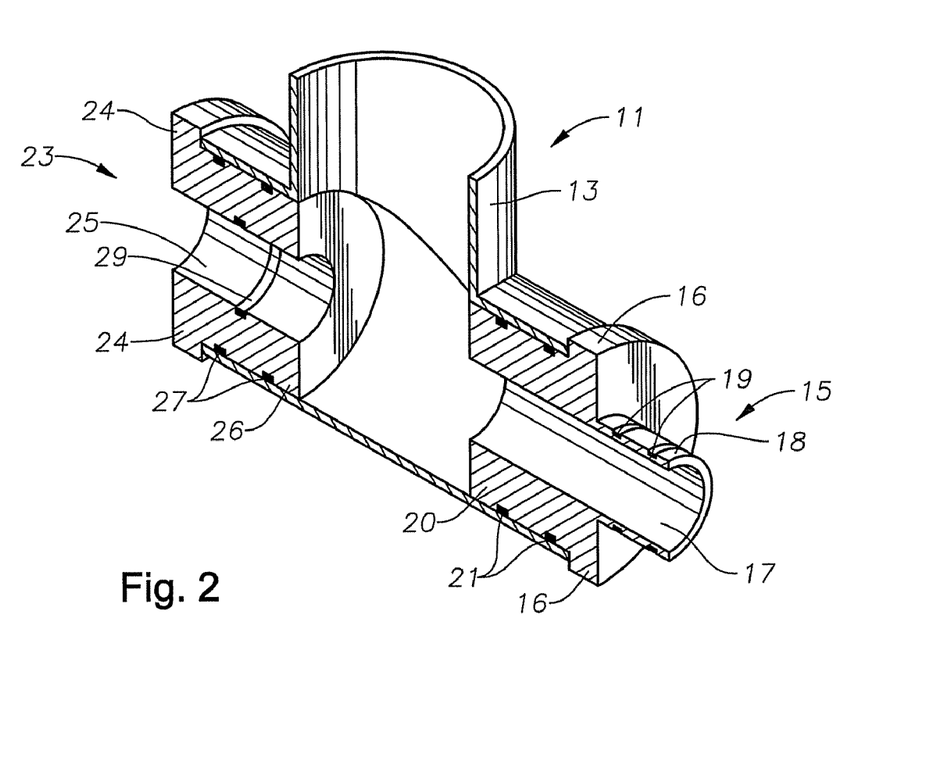
FIG. 2 is an isometric cross section of the face seal integrity verification tool of FIG. 1.

Referring to FIGS. 1 and 2, a face seal verification tool 11 is comprised of a clear plastic t-shaped liquid reservoir 13, guide adapter 15, and shaft adapter 23. In an alternate embodiment, liquid reservoir 13 could be constructed from a non-clear material. Liquid reservoir 13 is cylindrical in shape, and tool 11 has openings at each of its three ends. In an alternate embodiment, reservoir 13 could be shaped differently, such as a square or rectangle. At one end of reservoir 13, guide adapter 15 is connected. Guide adapter 15 is comprised of adapter flange 16, reservoir connector section 20, and seal connector section 18, all of which are cylindrical in shape and form one solid structure. In an alternate embodiment, the various components of adapter 15 could be shaped differently, such as squares or rectangles. The reservoir connection section 20 of adapter 15 connects to reservoir 13 by means of a set of O-rings 21 located on the outer diameter of section 20. The outer diameter of section 20 is slightly less than the inner diameter of reservoir 13. O-rings 21 ensure an air tight connection between adapter 15 and reservoir 13. On the other side of flange 16, seal connector section 18 extends outwards from flange 16 and a set of O-rings 19 are located on the outer diameter of section 18. The outer diameter of connector section 18 is designed to be slightly smaller than the inner diameter of the connection port. O-ring 19 will create an air-tight seal between the adapter 15 and any connection port. A hole 17 runs through the center of adapter 15 and is designed to accept a shaft.

On the end of reservoir 13 opposite adapter 15, shaft adapter 23 is located. Shaft adapter 23 is comprised of cap section 24 and connector section 26. Both cap section 24 and connector section 26 are cylindrical in shape. In an alternate embodiment, sections 24 and 26 could be shaped differently, such as squares or rectangles. The outer diameter of cap 24 is larger than the outer diameter of reservoir 13, creating a cap on the end of reservoir 13. Connector section 26 extends from cap 24 and a set of O-rings 27 are located on the outer diameter of section 26. The outer diameter of connector section 26 is slightly smaller than the inner diameter of reservoir 13, and connects shaft adapter 23 to reservoir 13. O-rings 27 ensure an air tight connection between adapter 23 and reservoir 13. A hole 25 extends through the center of adapter 23 and is designed to accept a shaft. An O-ring 29 is located on the inner diameter of section 26, and ensures an air tight seal between a shaft and verification tool 11. The third end of reservoir 13 remains open, and allows a testing liquid to be held in reservoir 13 of verification tool 11.

Figure 3:
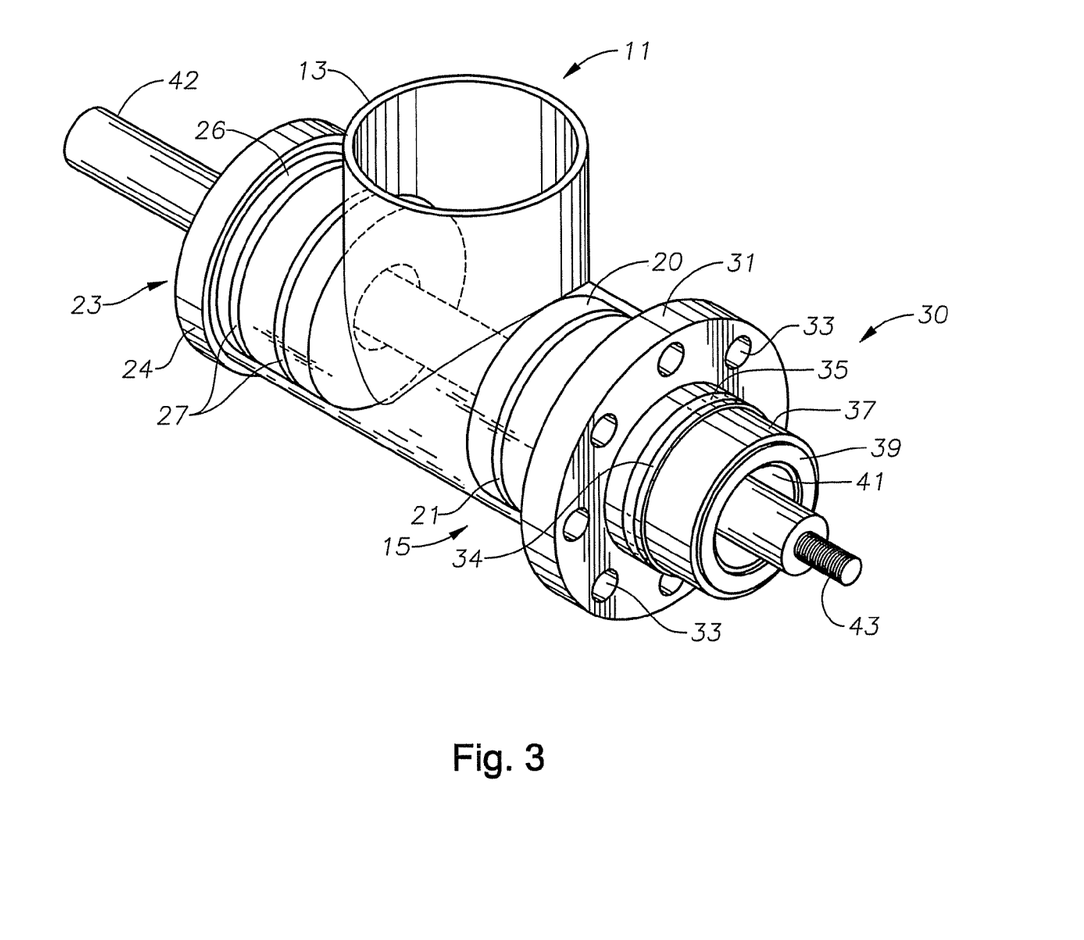
FIG. 3 is an isometric view of the face seal integrity verification tool of FIG. 1 with attachments for testing of an outboard seal face.

Verification tool 11 can be used to test both inboard and outboard mechanical seal faces for rotating shafts. The tool 11 ensures the proper assembly and seating of the seals, by detecting any leaks within the mechanical face seal. The testing can be conducted when assembling or disassembling seal sections. In order to test an outboard mechanical face seal, additional attachments are added to verification tool 11. Referring to FIG. 3, verification tool 11 (FIGS. 1 and 2) is attached to an outboard head adapter 30. Head adapter 30 is comprised of mounting flange 31, sealing section 34, and connector section 37, all of which are cylindrical in shape and form one solid structure. In an alternate embodiment, the various components of adapter 30 could be shaped differently, such as squares or rectangles. Mounting flange 31 contains bolt holes 33 that allow it to be secured to a seal head. Sections 34 and 37 are designed to connect to and seal the adapter 30 to a seal head. The outer diameter of section 34 is slightly larger than the outer diameter of section 37. An O-ring 35 is located on the outer diameter of section 34, and ensures an air-tight seal between the adapter 30 and a seal head (not shown). Section 34 extends from section 37 and is designed to fully extend into a seal head. A flat ring seal 39 is located on the end of section 37 and acts to seal off a pressure equalization port when connected to a seal head. Flat ring seal 39 surrounds a hole 41 which extends throughout adapter 30. A testing shaft 42 extends through adapter 30 and testing tool 11. Threaded end 43 of shaft 42 allows the testing shaft 42 to be connected to the seal shaft (not shown).

Figure 4:
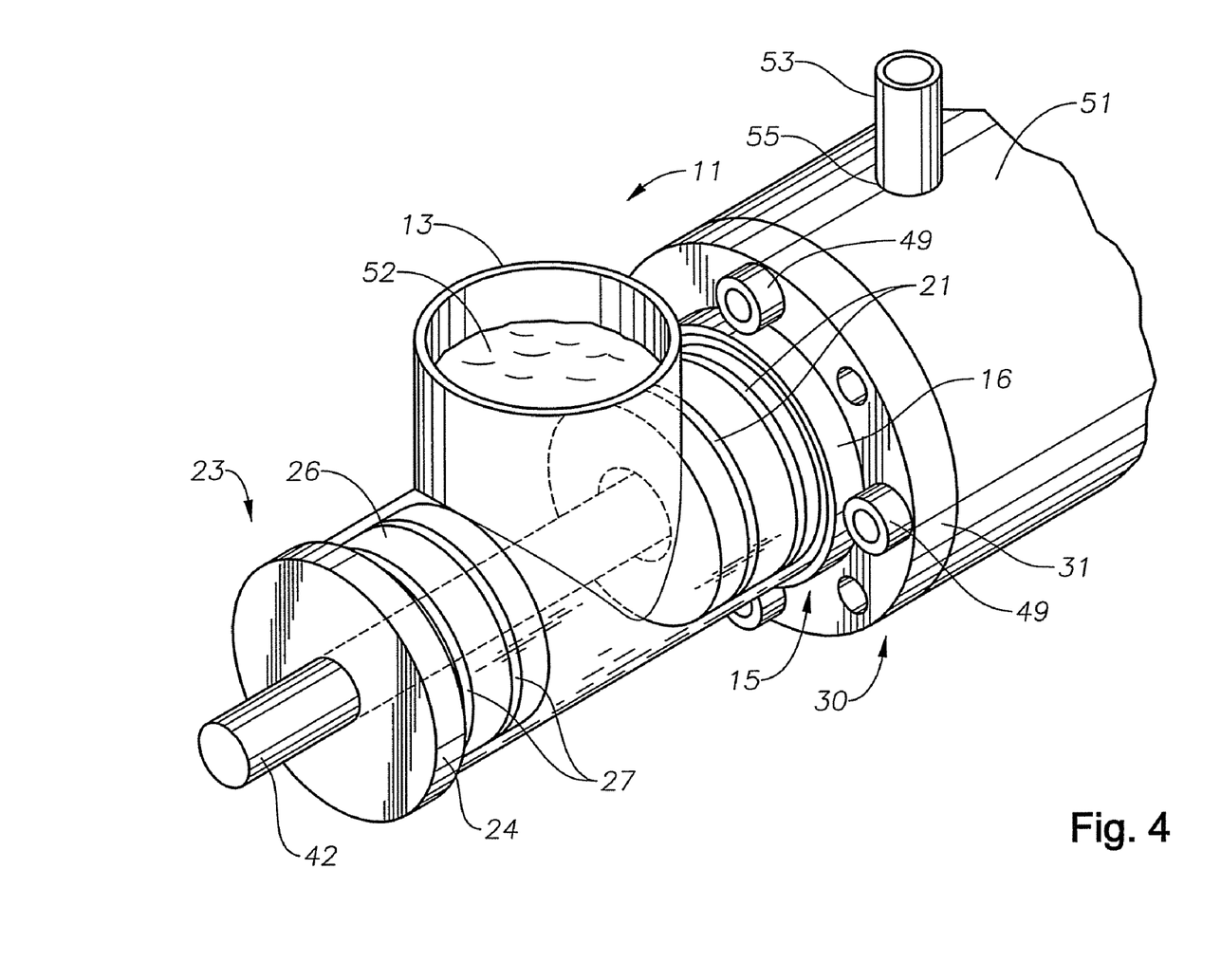
FIG. 4 is an isometric view of the verification tool and attachments of FIG. 3, connected to a seal head.
Figure 5:
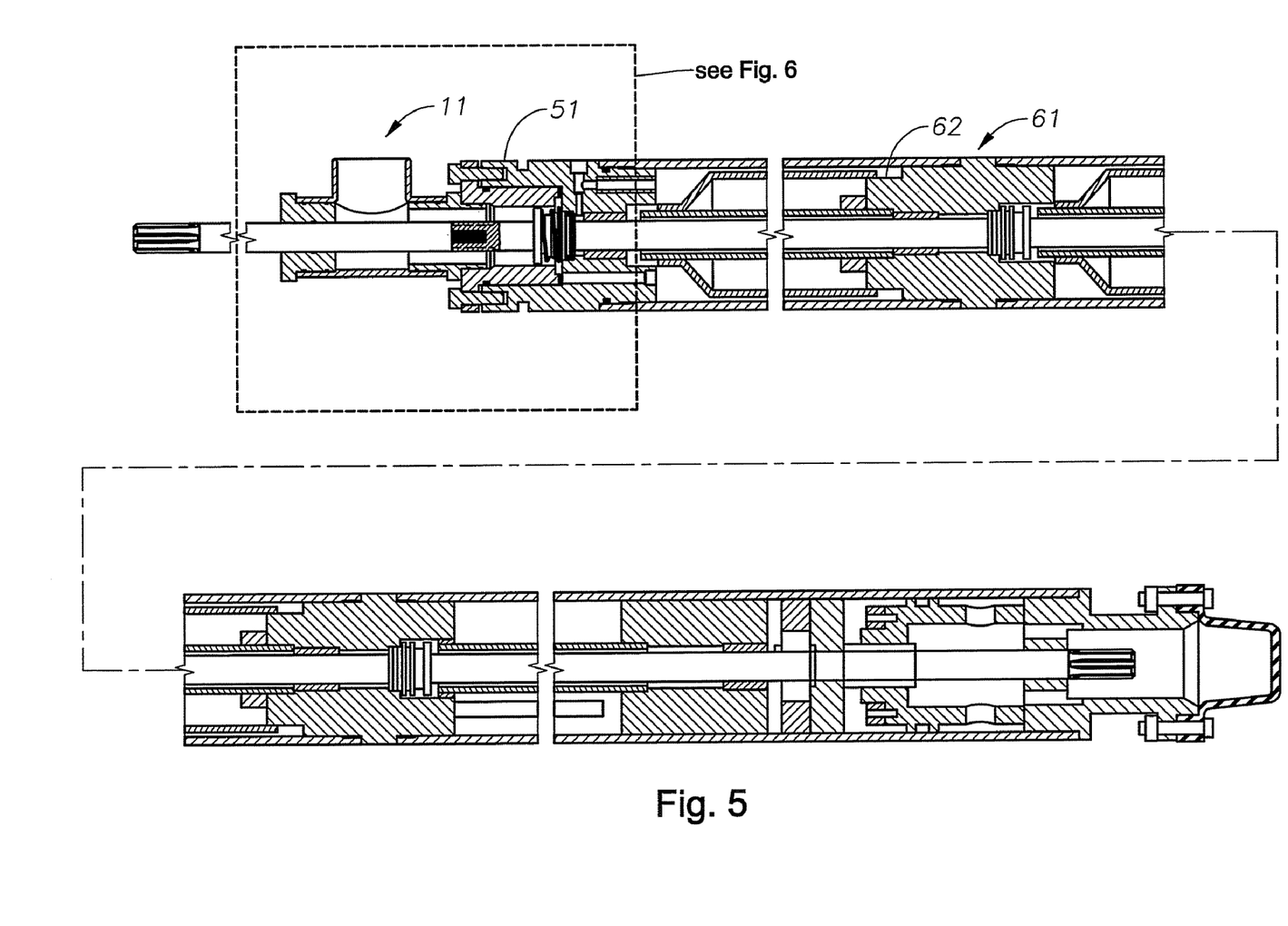
FIG. 5 is a sectional view of a shaft seal assembly with the verification tool connected to an outboard seal head.
Figure 6:
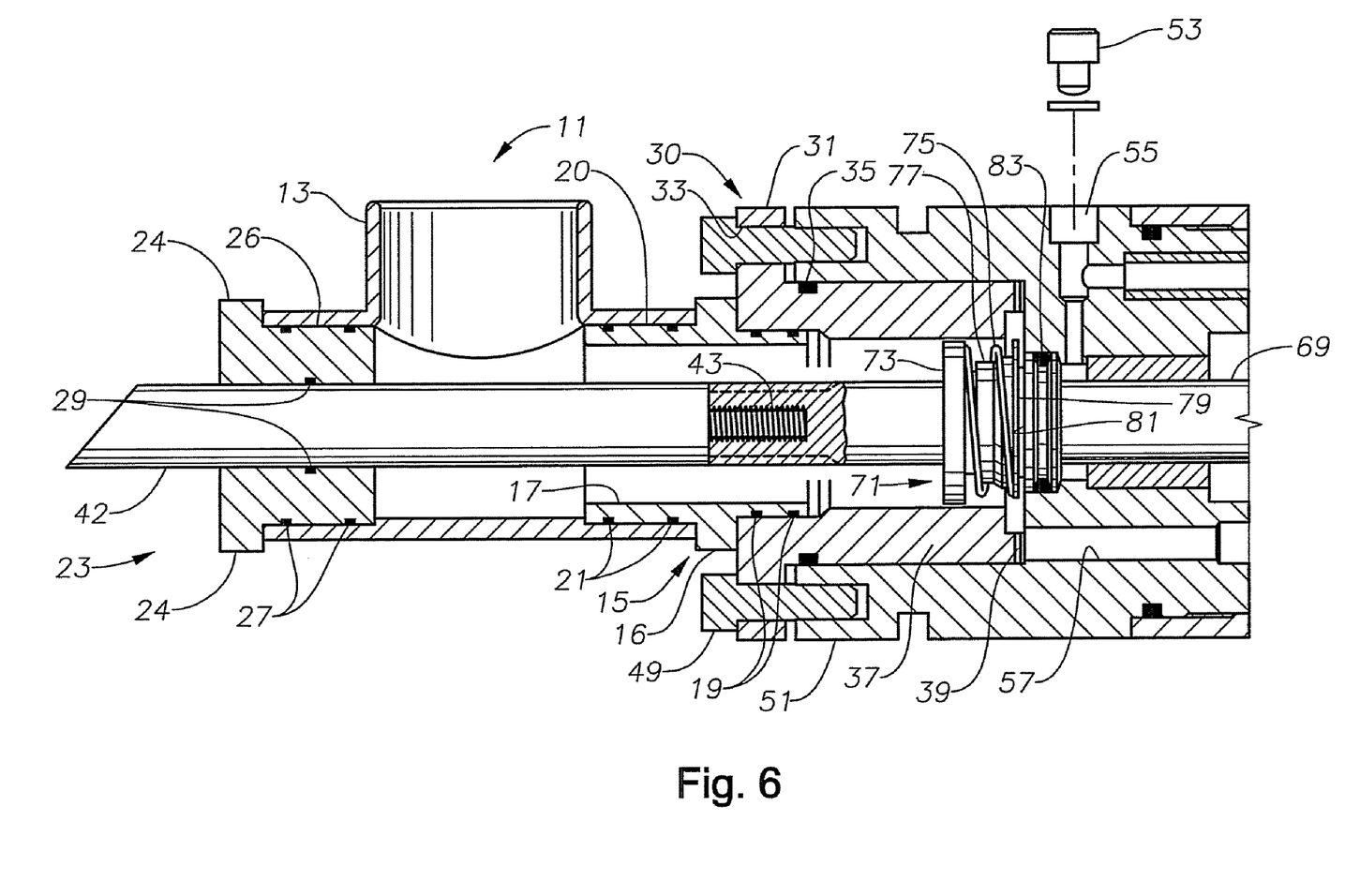
FIG. 6 is an isolated and enlarged view of FIG. 5.

Referring to FIGS. 4 through 6, when an outboard mechanical seal assembly 71 is to be tested the following procedures are implemented. Head adapter 30 is inserted into seal head 51. O-ring 35 ensures an air-tight seal between the adapter 30 and inner surface of seal head 51. Flat ring seal 39 seals off pressure equalization port 57 when adapter 30 is connected to seal head 51, preventing any flow through port 57. Bolts 49 are inserted into flange 31 and are screwed into seal head 51, securely connecting head adapter 30 to seal head 51. Test shaft 42 is then threaded into the end of seal shaft 69. Reservoir 13 and guide adapter 15 are placed on the shaft 42 through hole 17, and adapter 15 is inserted into flange 31 of adapter 30. O-rings 19 ensure an air tight seal between adapter 15 and adapter 30. Test unit 11 is held in engagement with adapter 30 by friction of its seals 19. Testing shaft 42 is lubricated with a lubricant such as oil. Adapter 23 is placed on shaft 42 through hole 25 and inserted into reservoir 13. O-rings 27 ensure an air tight seal between reservoir 13 and adapter 23. O-ring 29 (FIG. 2) ensures an air tight seal between adapter 23 and test shaft 42.

Verification tool 11 is now fully assembled and connected to seal head 51 for testing. Reservoir 13 is filled with a liquid 52 (FIG. 4) through the open port of reservoir 13. For example, this liquid 52 could be oil or another clear liquid that will allow bubbles to be seen through the clear plastic reservoir 13. Once the reservoir 13 has been filled with the liquid 52, the testing shaft 42 is rotated in order to allow any trapped air bubbles in the assembly to make their way through the liquid and out the open port of verification tool 11. Once no bubbles can be seen in the liquid 52, the mechanical seal assembly 71 is ready to be tested.

As shown in FIG. 6, a fill adapter 53 is attached to the vent port 55 located on seal head 51. An air source (not shown) is then attached to a test regulator (not shown), which is then attached to fill adapter 53. The test regulator (not shown) is adjusted until the air reaches a desired pressure, for example 5 psi. The air enters the seal head 51 through adapter 53 and port 55, and pressurizes the shaft seal sections on the backside of the mechanical face seal 71. The backside is the side opposite test unit 11. The mechanical seal 71 is comprised of spring keeper 73, spring 75, spring and bellows housing 77, rotating seal face 79, and stationary seal face 81. A rubber bellows (not visible) is contained within the spring and bellows housing 77, and seals around seal shaft 69. The rotating seal face 79 is attached to the rubber bellows (not visible). Spring 75 applies a force against the seal face 79 and bellows housing 77 that ensures that rotating seal face 79 stays in constant contact with stationary seal face 81. Spring 75 is located on the exterior side of seal face 79 and on an outboard end of the seal section. As indicated by the labels, rotating seal face 79 rotates with seal shaft 69, whereas the stationary seal face 81 does not rotate with shaft 69 and is stationary. O-ring 83 seals around the stationary seal face 81 and ensures an air tight seal between seal 81 and seal head 51.

As air pressure is applied to the backside of mechanical seal assembly 71, the air pressure acts against seal faces 79, 81. The clear reservoir 13 of tool 11 is monitored for air bubbles. The mechanical seal 71 can be tested for proper sealing with axial movement by pulling out a small increment on the testing shaft 42. The axial movement of testing shaft 42 is translated to the seal shaft 69 which also moves axially, placing the seal shaft 69 in tension. Again, the clear reservoir 13 of tool 11 is monitored for bubbles. The mechanical seal can be tested for proper sealing with rotational movement by rotating testing shaft 42 several times. Seal shaft 69 rotates in unison with test shaft 42. Again, the clear reservoir 13 of tool 11 is monitored for bubbles. If no bubbles are seen in clear reservoir 13 of tool 11 within a specific time, for example one minute, of performing the procedures above, the shaft seal 71 is intact and did not leak. If air bubbles are seen in the reservoir 13, test shaft 42 is rotated to eliminate any air that may be trapped within or behind the testing assembly. If the bubbles continue after rotating test shaft 42, the shaft seal 71 may have been compromised.

Once seal 71 has been properly tested, the air pressure is reduced to zero. The air hose (not shown) is removed from fill adapter 53, and fill adapter 53 is removed from vent port 55.

The liquid 52 in reservoir 13 is dumped into a catch basin (not shown), and the verification tool 11 and seal adapter 30 are removed in the reverse order of how they were installed.

Figure 7:
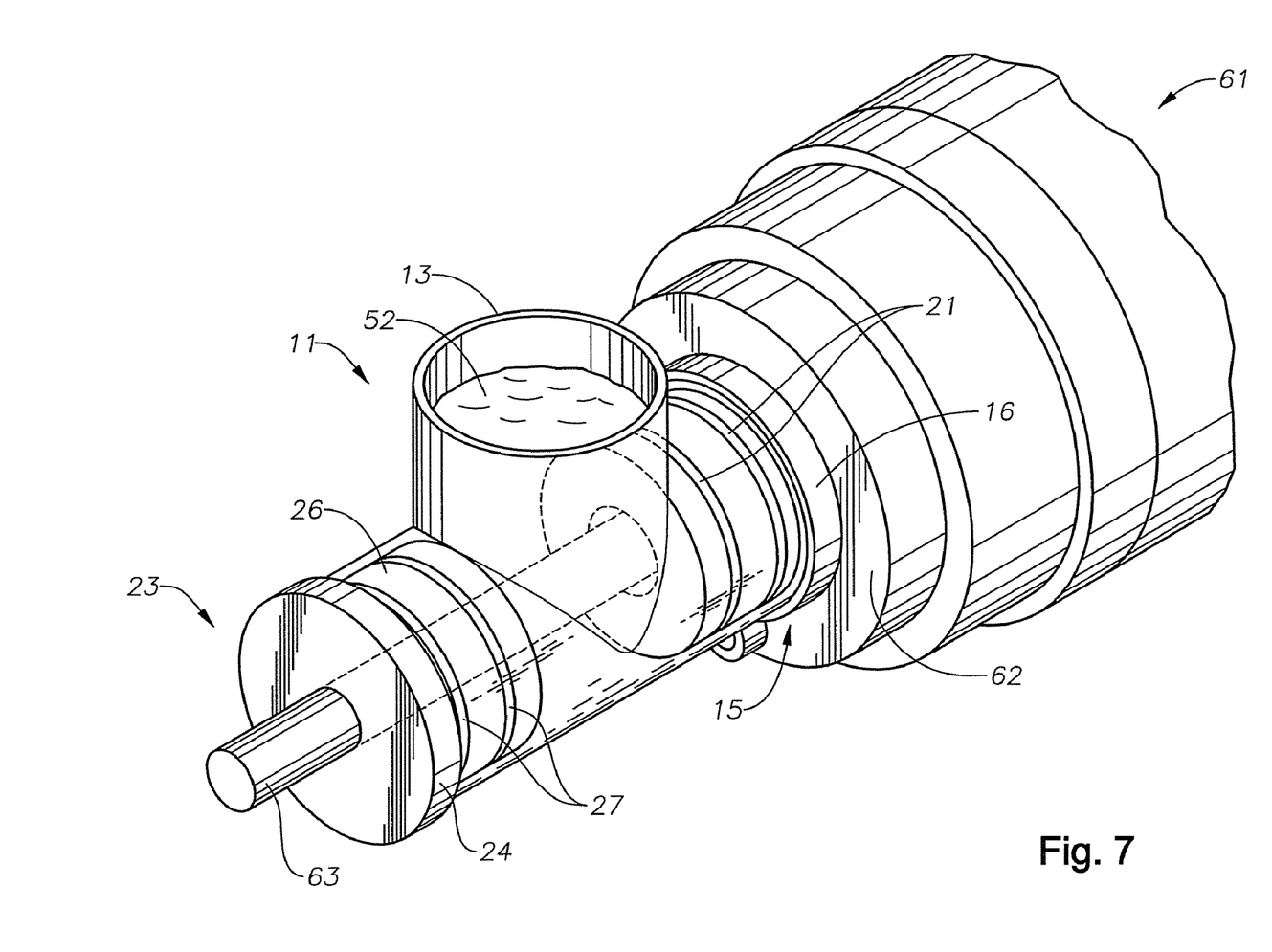
FIG. 7 is an isometric view of the verification tool of FIG. 1 attached to an outboard seal guide assembly.
Figure 8:
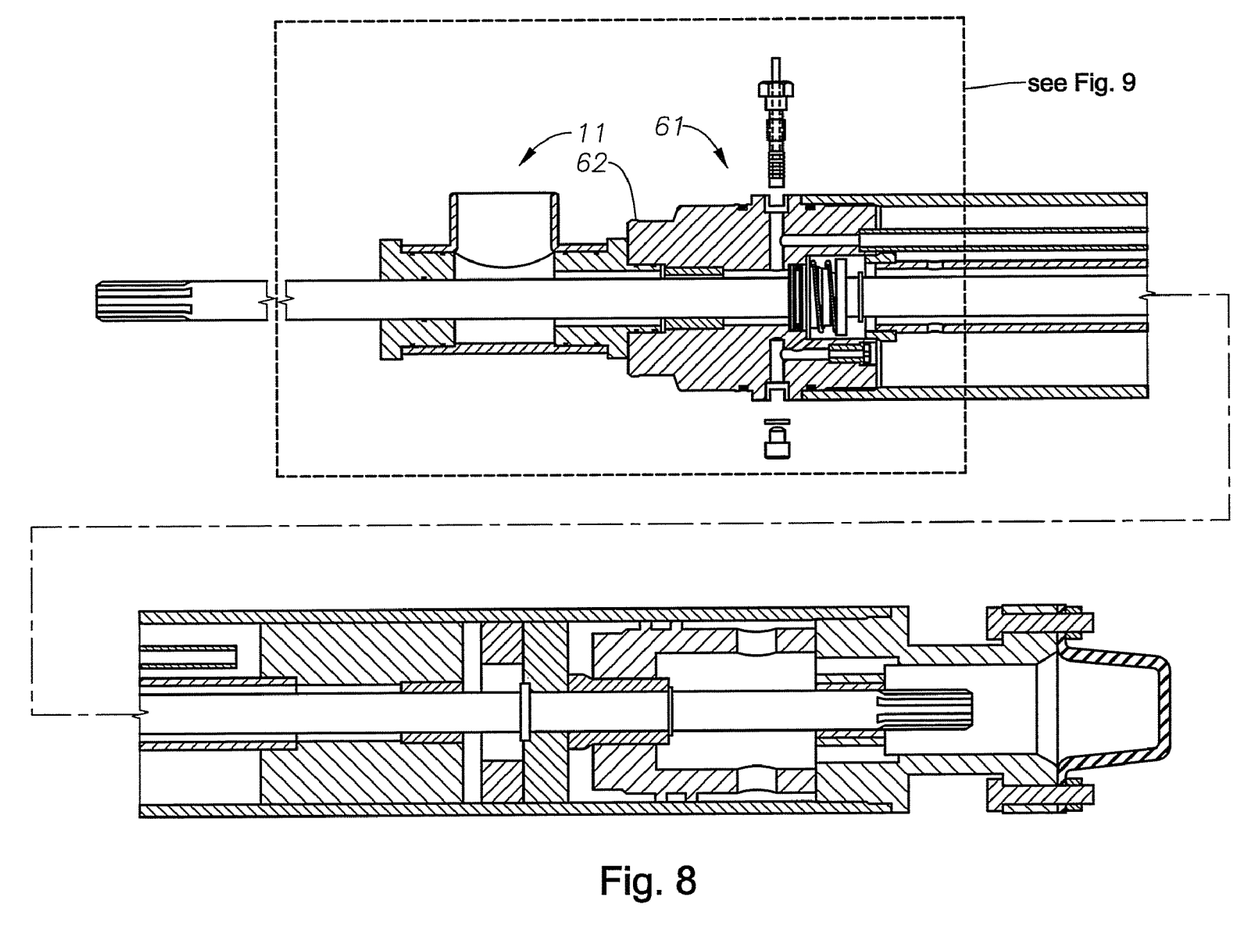
FIG. 8 is a sectional view of a guide seal assembly with the verification tool connected to an inboard guide seal.
Figure 9:
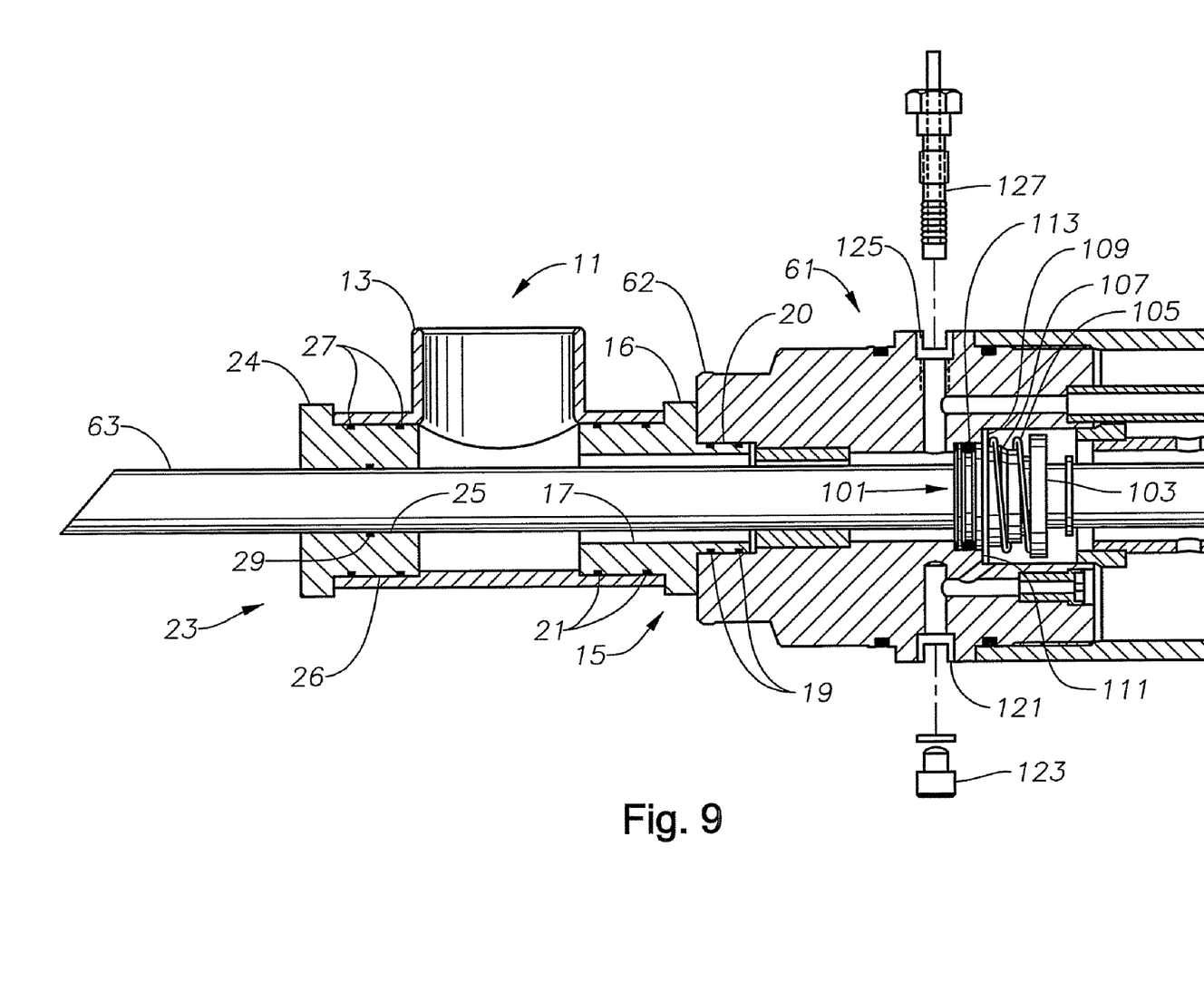
FIG. 9 is an isolated and enlarged view of FIG. 8.

Referring to FIGS. 7 through 9, when an inboard mechanical seal assembly 101 is to be tested, the following procedures are implemented. Reservoir 13 and guide adapter 15 are placed on seal shaft 63 through hole 17 and adapter 15 is inserted into guide seal 62 of the guide seal assembly 61. O-rings 19 ensure an air tight seal between adapter 15 and guide seal 62. Seal shaft 63 is lubricated with a lubricant such as oil. Adapter 23 is then placed on seal shaft 63 through hole 25 and inserted into reservoir 13. O-rings 27 ensure an air tight seal between reservoir 13 and adapter 23. O-ring 29 (FIG. 2) ensures an air tight seal between adapter 23 and seal shaft 63. Adapter 30 (FIG. 3) is not required because seal section coupling 62 is threaded between two parts of the seal section, as shown in FIG. 5, and does not have a bolt flange pattern. Connector section 18 inserts sealingly into the passage surrounding seal section shaft 63 and is held by friction of its seals 19. The vent port plug (not shown) and construction port plug (not shown) are removed from the guide assembly 62. A fill adapter 123 is inserted into vent port 121 and securely tightened in place. A construction blocking tool 127 is inserted into construction port 125 and securely tightened in place. The blocking tool 127 ensures that no air can travel through construction port 125.

Verification tool 11 is now fully assembled and connected to guide seal assembly 62 for testing. Reservoir 13 is filled with a liquid 52 through the open port of reservoir 13. For example, this liquid 52 could be oil or another clear liquid that will allow bubbles to be seen through the clear plastic reservoir 13. Once the reservoir 13 has been filled with the liquid 52, the seal shaft 63 is rotated in order to allow any trapped air bubbles in the assembly to make their way through the liquid and out the open port of verification tool 11. Once no bubbles can be seen in the liquid 52, the mechanical seal assembly 101 is ready to be tested.

An air source (not shown) is then attached to a test regulator (not shown), which is then attached to fill adapter 123. The test regulator (not shown) is adjusted until the air reaches a desired pressure, for example 5 psi. The air enters the seal head guide assembly 62 through fill adapter 123 and port 121, and pressurizes the seal sections on the backside of the mechanical seal 101.

The mechanical seal 101 is comprised of spring keeper 103, spring 105, spring and bellows housing 107, rotating seal face 109, and stationary seal face 111. A rubber bellows (not visible) is contained within the spring and bellows housing 107, and seals around the shaft 63. The rotating seal face 109 is attached to the rubber bellows (not visible). Spring 105 applies a force against the spring, and bellows housing 107 that ensures that rotating seal face 109 stays in constant contact with stationary seal face 111. As indicated by the labels, rotating seal face 109 rotates with seal shaft 63, whereas the stationary seal face 111 does not rotate with shaft 63 and is stationary. O-ring 113 seals between the stationary seal face 111 and seal guide 61. Spring 105 is located on the interior side of rotating seal face 111.

As air pressure is applied to the backside of mechanical seal assembly 101, the air pressure acts against seal faces 109, 111. The clear reservoir 13 of tool 11 is monitored for air bubbles. If bubbles immediately appear in reservoir 13, blocking tool 127 is tightened until the bubbles stop. If blocking tool 127 is tightened down and bubbles persist at a quick rate, the rubber part of blocking tool 127 may need to be replaced. The blocking tool 127 is removed and the rubber is replaced. Blocking tool 127 is reinserted into construction port 125, and the test is run again. After no air bubbles are visible in reservoir 13, no action is performed for a specific period of time, for example one minute.

After the specific time has passed, the mechanical seal 101 can be tested for proper sealing with axial movement by pulling out on the seal shaft 63. Again, the clear reservoir 13 of tool 11 is monitored for bubbles. The mechanical seal can be tested for proper sealing with rotational movement by rotating seal shaft 63 several times. Again, the clear reservoir 13 of tool 11 is monitored for bubbles. If no bubbles are seen in clear reservoir 13 of tool 11 within a specific time, for example one minute, of performing the procedures above, the shaft seal 101 is intact and did not leak. If air bubbles are seen in the reservoir 13, test shaft 63 is rotated to eliminate any air that may be trapped within or behind the testing assembly. If the bubbles continue after tightening construction tool 127, replacing the rubber of construction tool 127, or rotating test shaft 63, the shaft seal 101 may have been compromised.

Once seal 101 has been properly tested, the air pressure is reduced to zero. The air hose (not shown) is removed from fill adapter 123, and fill adapter 123 is removed from vent port 121, and construction blocking tool 127 is removed from construction port 125. The liquid 52 in reservoir 13 is dumped into a catch basin (not shown), and the verification tool 11 and seal adapter 30 are removed in the reverse order of how they were installed.

The seal verification tool 11 has many advantages as it allows testing of mechanical seals in rotating shaft assemblies during assembly or disassembly of the seal sections. During assembly, the tool allows each section to be tested prior to the completion of next section, ensuring that the each shaft seal is properly functioning as the structure is assembled. This prevents a situation where an entire seal assembly would have to be broken down to fix a leaking shaft seal if the structure was only tested after full assembly.

While the invention has been shown in only a few of its forms, it should be apparent to those skilled in the art that it is not so limited but is susceptible to various changes without departing from the scope of the invention.

The invention claimed is:

1. An apparatus for testing the integrity of a mechanical face seal that seals around a rotatable shaft of a submersible seal assembly, the apparatus comprising:
    a liquid reservoir having a body;
    a guide adapter connected to the body and having an opening extending therethrough, the guide adapter adapted to connect to a portion of the submersible seal assembly containing the shaft seal;
    a shaft adapter connected to the body, the shaft adapter having an opening extending therethrough coaxial with the opening in the guide adapter;
    a test shaft extending coaxially through the openings for engagement with the shaft of the seal assembly;
    the opening in the guide adapter being larger in diameter than the test shaft and being in communication with the reservoir to communicate liquid from the reservoir to a first side of the seal; and
    the body having a transparent portion to observe any gas bubbles that might migrate from the first side to the second side of the seal in response to gas pressure being applied to the second side of the seal.

2. The apparatus of claim 1, wherein the opening in the shaft adapter sealingly engages the test shaft.

3. The apparatus of claim 1, wherein the reservoir has an axis perpendicular to the axis of the openings of the guide adapter and the shaft adapter and is open to allow liquid to be poured therein.

4. The apparatus of claim 1, wherein:
the test shaft has an engagement end that couples to the shaft of the seal assembly so that rotation of the test shaft causes the shaft of the seal assembly to rotate.

5. The apparatus of claim 4, wherein the engagement end is capable of transmitting a pulling force on the test shaft to the shaft of the seal assembly so as to cause slight axial movement of the shaft of the seal assembly.

6. The apparatus of claim 4, wherein the engagement end of the test shaft comprises a threaded end.

7. The apparatus of claim 4, wherein the test shaft has a portion that protrudes from the shaft adapter for manual rotation.

8. A method for testing the integrity of a mechanical face seal surrounding a shaft of a portion of a submersible seal assembly, the method comprising:
(a) providing a test apparatus with a liquid reservoir;
(b) connecting a test shaft of the test apparatus to the end of a shaft of the seal assembly;
(c) connecting the test apparatus to a seal head of the seal assembly on a frontside of the seal;
(d) filling the liquid reservoir with a liquid and communicating the liquid to the frontside of the seal;
(e) applying a gas pressure to the backside of the seal; and
(f) observing the liquid in the liquid reservoir for the existence of bubbles that may migrate past the shaft seal.

9. The method of claim 8, further comprising:
while performing step(e), rotating the test shaft to cause the shaft of the seal assembly to rotate.

10. The method of claim 8, further comprising:
while performing step(e), pulling axially on the test shaft to apply tension to the shaft of the seal assembly.

11. The method according to claim 8, wherein step (a) comprises making at least a portion of the reservoir transparent so as to observe any bubbles in step (f) by viewing through said portion of the reservoir.

12. The method according to claim 8, wherein the mechanical face seal has a stationary face and a rotating face urged by a spring against the stationary face, and step (e) comprises applying the gas pressure at a point to determine the integrity of the shaft seal.

13. The method according to claim 8, wherein step (c) comprises bolting a portion of the test apparatus to a bolt pattern on the seal head of the assembly.

14. The method according to claim 8, wherein step (b) comprises securing a threaded portion on the end of the test shaft to a threaded portion on the end of the shaft in the seal assembly.

15. A method for testing the integrity of a mechanical face seal surrounding a shaft of a portion of a submersible seal assembly, the method comprising:
(a) providing a test apparatus with a liquid reservoir;
(b) connecting a test shaft of the test apparatus to the end of a shaft of the seal assembly;
(c) connecting the test apparatus to a seal head of the assembly on a frontside of the seal;
(d) filling the liquid reservoir with a liquid and communicating the liquid to the frontside of the seal;
(e) applying a gas pressure to the backside of the shaft seal;
(f) observing the liquid in the liquid reservoir for the existence of bubbles that may migrate past the seal;
(g) while performing step(e), rotating the test shaft to cause the shaft of the seal assembly to rotate; and
(h) while performing step(e), pulling axially on the test shaft to apply tension to the shaft of the seal assembly.

16. The method according to claim 15, wherein step (a) comprises making at least a portion of the reservoir transparent so as to observe any bubbles in step (f) by viewing through said portion of the reservoir.

17. The method according to claim 15, wherein the mechanical face seal has a stationary face and a rotating face urged by a spring against the stationary face, and step (e) comprises applying the gas pressure at a point to detect leakage between seal faces.

18. The method according to claim 15, wherein step (c) comprises bolting a portion of the test apparatus to a bolt pattern on the seal head of the assembly.

19. The method according to claim 15, wherein step (b) comprises securing a threaded portion on the end of the test shaft to a threaded portion on the end of the shaft in the seal assembly.

* * * * *